(12) United States Patent
Tanigawa et al.

(10) Patent No.: US 8,675,574 B2
(45) Date of Patent: *Mar. 18, 2014

(54) OFDMA COMMUNICATION SYSTEM AND COMMUNICATION METHOD

(75) Inventors: Hironobu Tanigawa, Kanagawa (JP);
Yasuhiro Nakamura, Kanagawa (JP);
Nobuaki Takamatsu, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 580 days.

This patent is subject to a terminal disclaimer.

(21) Appl. No.: 12/442,340

(22) PCT Filed: Sep. 19, 2007

(86) PCT No.: PCT/JP2007/068210
§ 371 (c)(1),
(2), (4) Date: Jun. 23, 2009

(87) PCT Pub. No.: WO2008/035719
PCT Pub. Date: Mar. 27, 2008

(65) Prior Publication Data
US 2009/0303949 A1 Dec. 10, 2009

(30) Foreign Application Priority Data

Sep. 22, 2006 (JP) .................................. 2006-257969
Nov. 28, 2006 (JP) .................................. 2006-320777

(51) Int. Cl.
*H04W 4/00* (2009.01)
(52) U.S. Cl.
USPC ........... 370/329; 370/203; 370/208; 370/343; 370/431; 370/438
(58) Field of Classification Search
USPC .................. 370/203, 208, 329, 343, 431, 438
See application file for complete search history.

(56) References Cited

U.S. PATENT DOCUMENTS 6,094,429 A * 7/2000 Blanchette et al. ........... 370/347
6,246,876 B1 * 6/2001 Hontzeas ...................... 455/436

(Continued)

FOREIGN PATENT DOCUMENTS

| CN | 1774137 A | 5/2006 |
| JP | 2000115834 A | 4/2000 |

(Continued)

OTHER PUBLICATIONS

Japanese language office action and its English language translation for corresponding Japanese application 2006320777.

(Continued)

*Primary Examiner* — Jay P Patel
(74) *Attorney, Agent, or Firm* — DLA Piper LLP (US)

(57) ABSTRACT

There is provided an OFDMA communication system capable of suppressing the communication resource reduction and reducing the processing load on a base station. The system includes a downlink frame generation unit (14) that generates a downlink frame for a downlink period for performing communication to at least one terminal (20) of a plurality of terminals from the base station (10), an uplink frame generation unit (24) that generates an uplink frame for an uplink period for performing communication to the base station (10) from at least one terminal (20) of the plurality of terminals, and a channel allocation unit that allocates, for one terminal of the plurality of terminals, one or more subchannels available in the one terminal, wherein the channel allocation unit notifies information of the allocated one or more available subchannels to the one terminal only by the downlink frame.

4 Claims, 13 Drawing Sheets

(56) References Cited

U.S. PATENT DOCUMENTS

| | | | |
|---|---|---|---|
| 6,563,806 B1 | 5/2003 | Yano et al. | |
| 6,956,836 B2* | 10/2005 | Chen et al. | 370/330 |
| 7,020,110 B2 | 3/2006 | Walton et al. | |
| 7,299,048 B2* | 11/2007 | Lim et al. | 455/442 |
| 7,522,637 B2* | 4/2009 | Kim et al. | 370/480 |
| 7,558,293 B2* | 7/2009 | Choi et al. | 370/509 |
| 7,668,136 B2* | 2/2010 | Yu | 370/329 |
| 7,684,372 B2 | 3/2010 | Beale et al. | |
| 7,684,379 B2* | 3/2010 | Kim et al. | 370/343 |
| 7,764,649 B2 | 7/2010 | Kim et al. | |
| 2004/0057407 A1* | 3/2004 | Balachandran et al. | 370/336 |
| 2005/0250506 A1 | 11/2005 | Beale et al. | |
| 2005/0288026 A1* | 12/2005 | Byun et al. | 455/442 |
| 2006/0002359 A1* | 1/2006 | Kim et al. | 370/343 |
| 2006/0007849 A1* | 1/2006 | Kim et al. | 370/208 |
| 2006/0009228 A1* | 1/2006 | Kang et al. | 455/450 |
| 2006/0121921 A1 | 6/2006 | Tajima et al. | |
| 2006/0135164 A1 | 6/2006 | Kim et al. | |
| 2006/0153227 A1* | 7/2006 | Hwang et al. | 370/465 |
| 2007/0286066 A1* | 12/2007 | Zhang et al. | 370/208 |
| 2008/0031190 A1* | 2/2008 | Bae et al. | 370/329 |
| 2008/0043699 A1* | 2/2008 | Park et al. | 370/342 |
| 2008/0212462 A1* | 9/2008 | Ahn et al. | 370/209 |
| 2010/0040014 A1* | 2/2010 | Kang et al. | 370/329 |

FOREIGN PATENT DOCUMENTS

| | | |
|---|---|---|
| JP | 2000236343 A | 8/2000 |
| JP | 2003018117 A | 1/2003 |
| JP | 20040073551 A | 8/2004 |
| JP | 20060038952 A | 5/2006 |
| JP | 2006141038 A | 6/2006 |
| WO | 03003617 A2 | 1/2003 |
| WO | 03058871 A1 | 7/2003 |
| WO | 2005002141 A1 | 1/2005 |

OTHER PUBLICATIONS

"Daini Sedai Cordless Denwa System Hyojun Kikaku RCR STD-28" Second Edition, revised, Association of Radio Industries and Businesses, pp. 63-64 and 120-122, Jun. 1996.

International search report for corresponding PCT application PCT/JP2007/068210.

Korean language office action dated Feb. 11, 2011 and its English language translation for corresponding Korean application 20097005812.

Chinese language office action dated Mar. 24, 2011 and its English language translation for corresponding Chinese application 200780034909.

Japanese language office action and its English language office action for corresponding Japanese application 2006257969.

Extended European search report dated Dec. 29, 2010 for corresponding European application 07807579.3.

* cited by examiner

OFDMA COMMUNICATION SYSTEM AND COMMUNICATION METHOD

CROSS-REFERENCE TO THE RELATED APPLICATIONS

This application is a national stage of international application No. PCT/JP2007/068210 filed Sep. 19, 2007, which also claims the benefit of priority under 35 USC 119 to Japanese Patent Application No. 2006-257969 filed Sep. 22, 2006 and Japanese Patent Application No. 2006-320777 filed Nov. 28, 2006, the entire contents of which are incorporated herein by reference.

TECHNICAL FIELD

The present invention relates to an OFDMA communication system and communication method.

BACKGROUND ART

As a wireless access scheme of a digital portable telephone system, a PHS system, and the like, a TDMA (Time Division Multiple Access)/TDD (Time Division Duplex) scheme in which TDMA and TDD are combined has been adopted. Recently, an OFDMA (Orthogonal Frequency Division Multiplexing Access) scheme using OFDMA based on a technique of OFDM (Orthogonal Frequency Division Multiplexing) has been proposed.

The OFDM is a scheme of dividing a carrier for data modulation into a plurality of "subcarriers" (subdivided carriers) orthogonal to each other and distributing and transmitting a data signal in each subcarrier.

Hereinafter, the overview of the OFDM scheme will be described.

Figure 8:
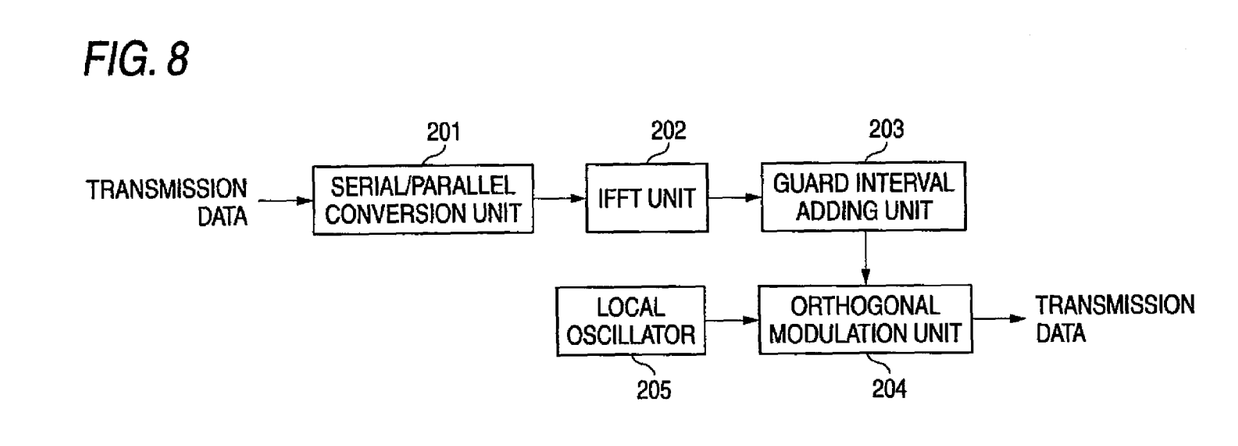
FIG. 8 is a block diagram showing a configuration of an OFDM modulation device to be used at a transmitting side.

FIG. 8 is a block diagram showing a configuration of an OFDM modulation device to be used at a transmitting side. Transmission data is input to the OFDM modulation device. The transmission data is supplied to a serial/parallel conversion unit 201 and converted into data including a plurality of low-speed transmission symbols. That is, a plurality of low-speed digital signals are generated by dividing transmission information. Parallel data is supplied to an inverse fast Fourier transform (IFFT) unit 202.

The parallel data is allocated to each subcarrier configuring OFDM and mapped in a frequency domain. Here, each subcarrier is modulated by BPSK, QPSK, 16QAM, 64QAM and the like. The mapping data is transformed from frequency-domain transmission data to time-domain transmission data by performing on IFFT operation. Thereby, multicarrier modulation signals into which a plurality of subcarriers orthogonal to each other are modulated independently are generated. An output of the IFFT unit 202 is supplied to a guard interval adding unit 203.

Figure 9:
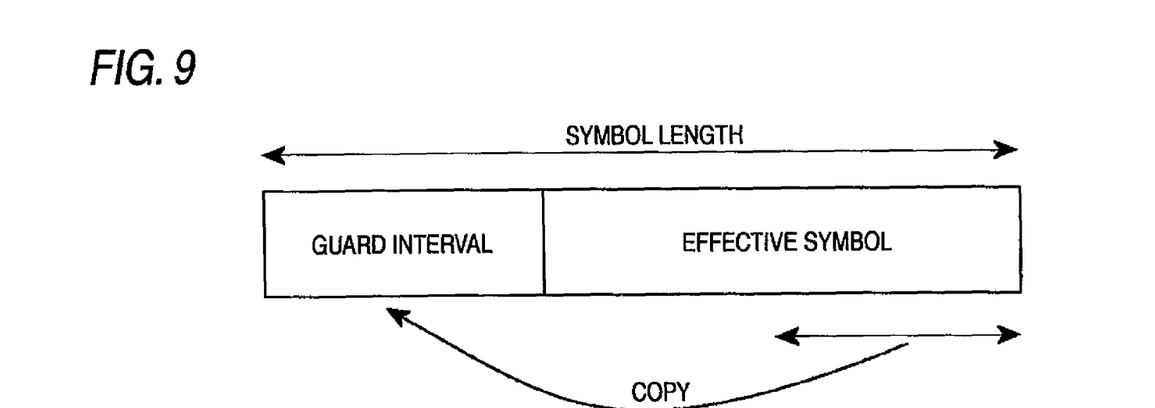
FIG. 9 is an illustrative diagram showing a guard interval.

As shown in FIG. 9, the guard interval adding unit 203 sets a rear part of an effective symbol of transmission data as a guard interval and adds its copy to a front part of an effective symbol period for every transmission symbol. A base-band signal obtained by the guard interval adding unit is supplied to an orthogonal modulation unit 204.

The orthogonal modulation unit 204 orthogonally modulates a base-band OFDM signal supplied from the guard interval adding unit 203 using a carrier signal supplied from a local oscillator 205 of the OFDM modulation device, and performs frequency conversion into an intermediate frequency (IF) signal or a radio frequency (RF) signal. That is, after frequency-converting the base-band signal into a desired transmission frequency band, the orthogonal modulation unit outputs it to a transmission path.

Figure 10:
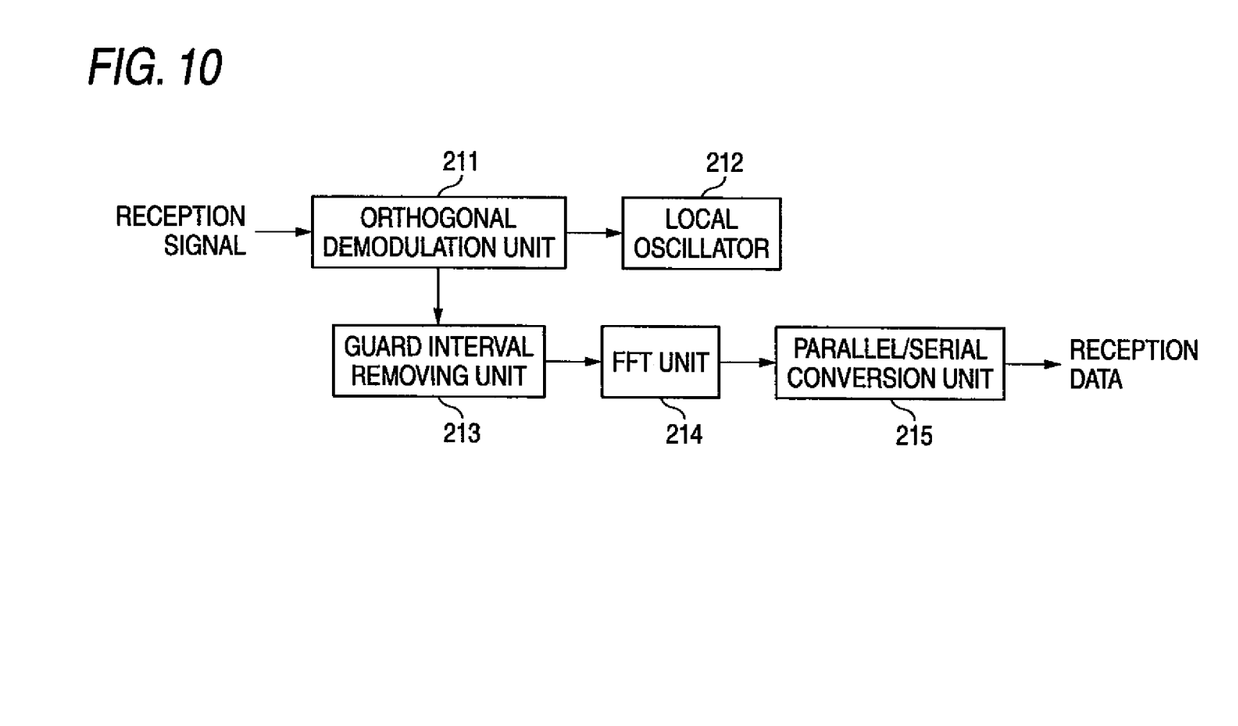
FIG. 10 is a block diagram showing a configuration of an OFDM modulation device to be used at a receiving side.

FIG. 10 is a block diagram showing a configuration of an OFDM demodulation device to be used at a receiving side. An OFDM signal generated by the OFDM modulation device of FIG. 8 is input to the OFDM demodulation device through a predetermined transmission path.

An OFDM reception signal input to the OFDM demodulation device is supplied to an orthogonal demodulation unit 211. The orthogonal demodulation unit 211 orthogonally demodulates the OFDM reception signal using a carrier signal supplied from a local oscillator 212 of the OFDM demodulation device, performs frequency conversion from an RF signal or an IF signal to a base-band signal, and obtains a base-band OFDM signal. The OFDM signal is supplied to a guard interval removing unit 213.

The guard interval removing unit 213 removes a signal added by the guard interval adding unit 203 of the OFDM modulation device according to a timing signal supplied from a symbol timing synchronizing unit (not shown). A signal obtained by the guard interval removing unit 203 is supplied to a fast Fourier transform (FFT) unit 214.

The FFT unit 214 performs transformation to frequency-domain reception data by performing an FFT operation on input time-domain reception data. Demapping is performed in the frequency domain and parallel data is generated for each subcarrier. Here, the demodulation to the modulation of BPSK, QPSK, 16QAM, 64QAM, etc. performed for each subcarrier is performed. Parallel data obtained by the FFT unit 214 is supplied to a parallel/serial conversion unit 215 and output as reception data.

The above-described OFDM is a scheme for dividing a carrier into a plurality of subcarriers. The OFDMA is a scheme for collecting and grouping a plurality of subcarriers among the subcarriers in the above-described OFDM and performing multiplex communication by allocating one or more groups to each user. Each group is called a subchannel. That is, each user performs communication using one or more subchannels allocated. According to a communication data amount, a propagation environment, and the like, subchannels are adaptively increased/decreased and allocated.

Next, an example of channel configuration of a communication system adopting the OFDMA scheme will be described.

Patent Document 1 describes a communication method based on asymmetric channels with different bandwidths. In the communication method, downstream line (downlink) communication is performed by a broadband channel, and upstream line (uplink) communication is performed by a narrowband channel.

Figure 11:
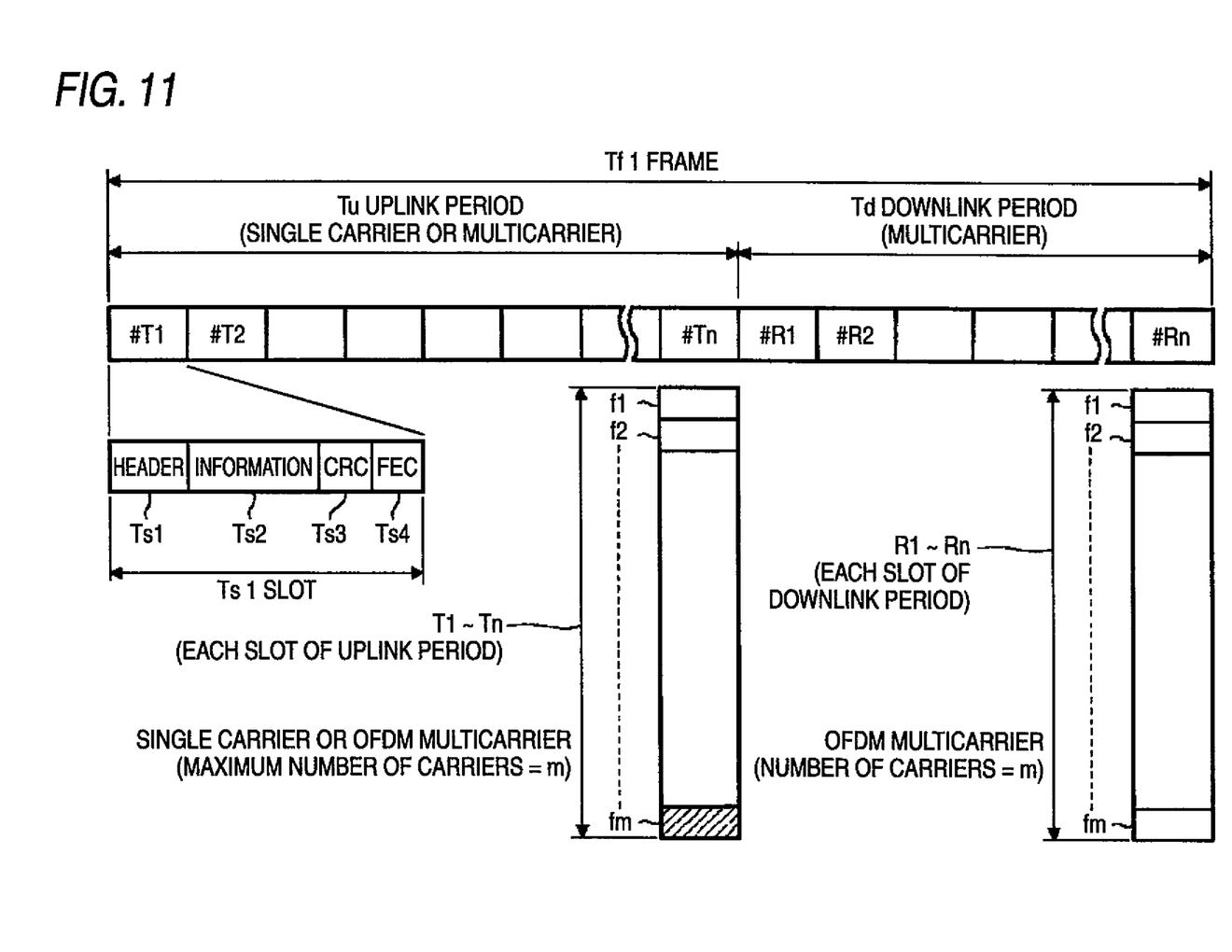
FIG. 11 is a configuration diagram of transmission control between a terminal device and a base station of Patent Document 1.

FIG. 11 is a configuration of transmission control between a terminal device and a base station in Patent Document 1. An OFDMA scheme is applied as an access scheme and different time slots within one frame are used by time division in the upstream line and the downstream line.

A predetermined number of slots T1, T2, . . . , Tn (where n is an arbitrary integer) of the first half of one frame are slots of an uplink period Tu as slots to be used for upstream line transmission from the terminal device in the base station. A predetermined number of slots R1, R2, . . . , Rn (where n is an arbitrary integer) of the second half of one frame are slots of a downlink period Td as slots to be used for downstream line transmission from the base station to the terminal device. As described above, a frame in which the uplink period and the downlink period are different from each other (times of the upstream and downstream are different from each other and slots configuring the upstream and downstream are different from each other) is referred to as an up-down asymmetric frame.

Figure 12:
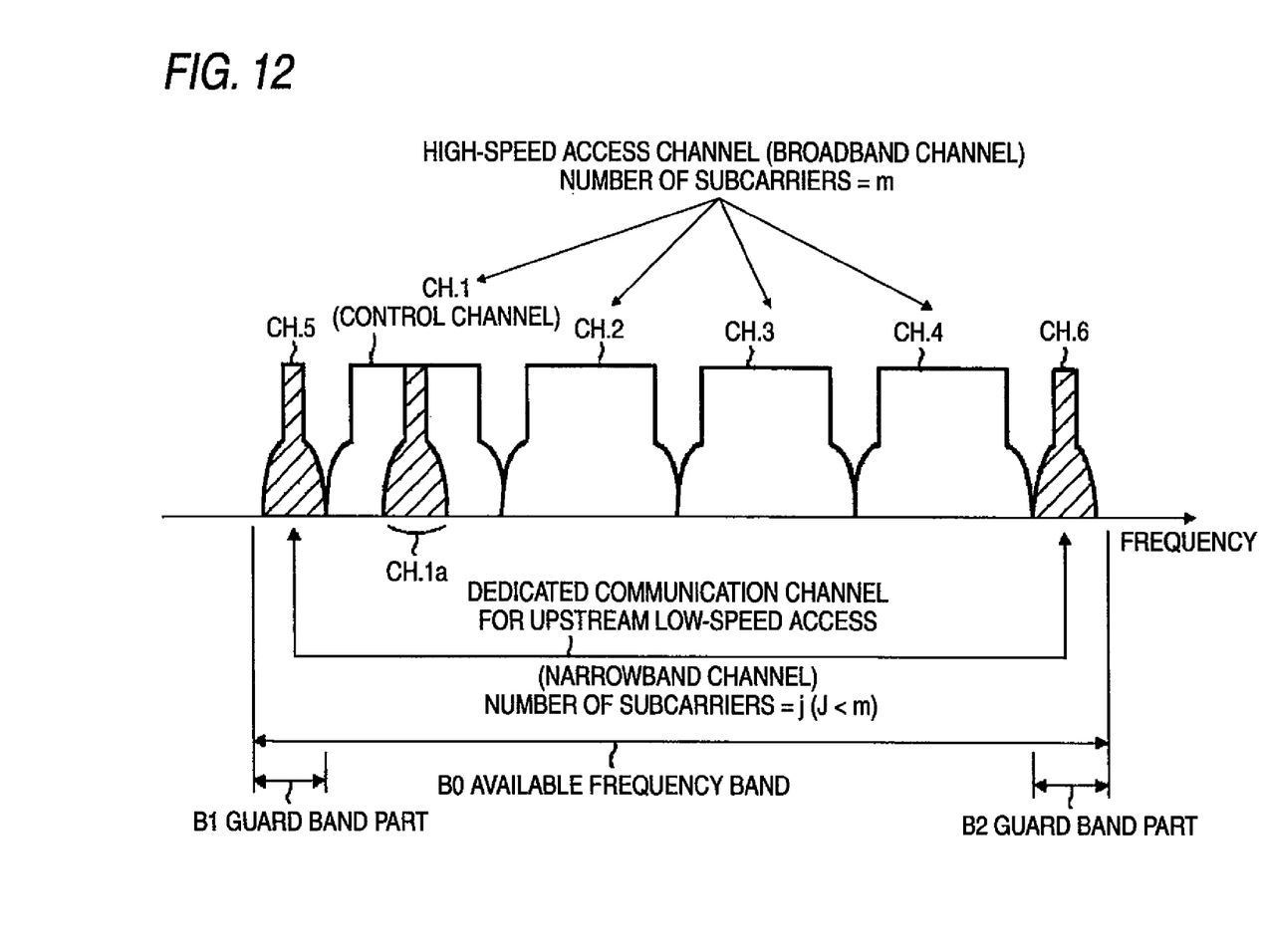
FIG. 12 is an example of a channel configuration in which data of the frame configuration of FIG. 11 is transmitted wirelessly.

FIG. 12 is an example of channel configuration in which data having the above-described frame configuration is transmitted wirelessly.

In this example, guard band parts B1 and B2 narrower than bandwidths of broadband channels CH1 to CH4 exist at an upper side and a lower side of an available frequency bond B0, B1 and B2 are arranged with narrowband channels CII5 and CII6 which are narrower than the broadband channels CH1 to CH4, respectively.

The narrowband channels CH5 and CH6 arranged in the guard band parts are used as dedicated communication channels for low-speed access in the upstream line (uplink), and only the uplink period Tu of the first half of the frame configuration shown in FIG. 11 is used for wireless transmission.

Patent Document 2 describes a communication method in which communication between a base station and a mobile station is performed by allocating a time slot to be used in each communication counterpart on the basis of a situation of a transmission waiting cell for each of the downstream line (downlink) and the upstream line (uplink), and a communication device adopting an OFDMA/TDD scheme for allocating a user channel according to a transmission/reception amount and QoS of each asymmetric channel.

Figure 13:
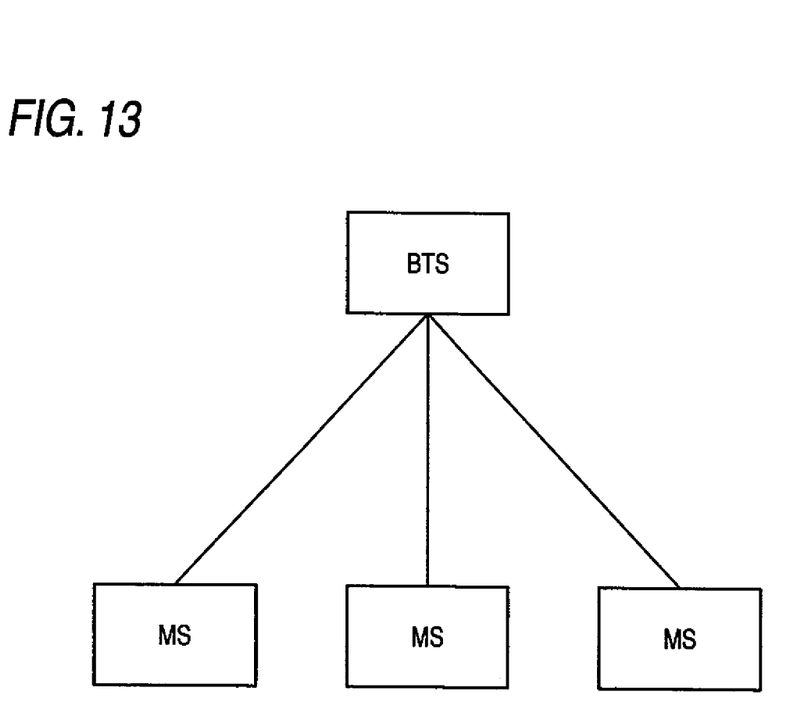
FIG. 13 is a schematic diagram showing a configuration of a communication system of Patent Document 2.

FIG. 13 is a schematic diagram showing a configuration of a communication system of Patent Document 2. Communication adopting the OFDMA scheme is performed between a base station (BTS) and a mobile station (MS).

Figure 14:
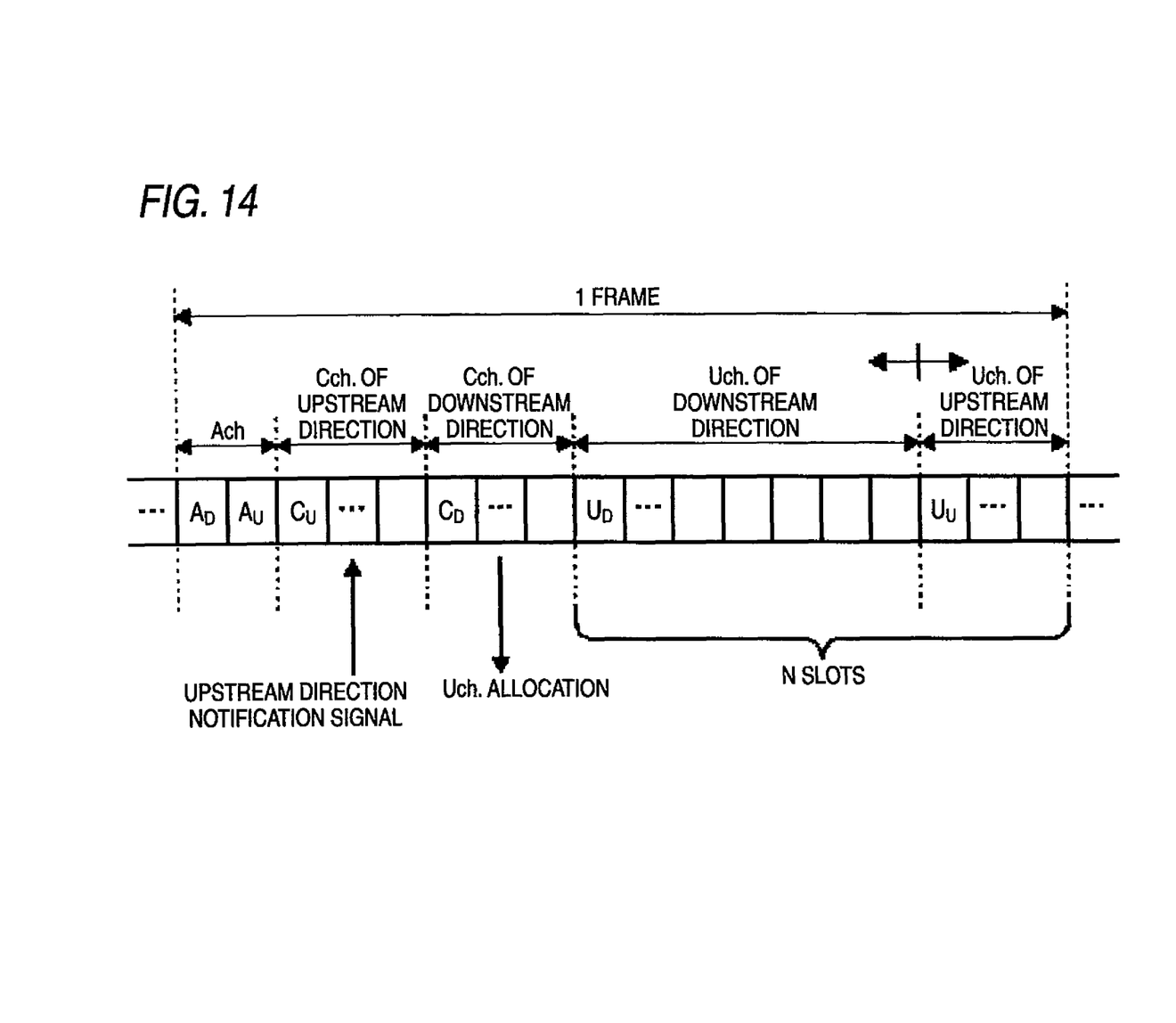
FIG. 14 is a schematic diagram showing the format of a frame to be used in a wireless communication device of Patent Document 2.

FIG. 14 is a schematic diagram showing the format of a frame to be used in a wireless communication device of Patent Document 2. As shown, a unit frame (1 frame) includes an access channel (Ach), a control channel (Cch) of an upstream direction, a control channel (Cch) of a downstream direction, a user channel (Uch) of the downstream direction, and a user channel (Uch) of the upstream direction.

The number of time slots including each, of the user channel of the downstream direction and the user channel of the upstream direction is not fixed, and a boundary position is determined on the basis of a user channel allocation result.

Patent Document 1: JP-A-2000-115834
Patent Document 2: JP-A-2000-236343

DISCLOSURE OF THE INVENTION

Problem that the Invention is to Solve

In a communication system adopting the conventional OFDMA scheme as described above, information indicating which subchannel is allocated to which terminal for communication with a base station is referred to as MAP information and pre-notified from the base station to each terminal. In the conventional OFDMA scheme, channel configuration of the downstream line (downlink) and the upstream line (uplink) are asymmetric frame configuration. Thus, in the above-described communication system, MAP information for each of a plurality of terminals needs to be transmitted MAP information for a downlink frame and MAP information for an uplink frame separately.

However, since MAP information of each of the downlink frame and the uplink frame has to be transmitted, on information amount of the MAP information is large and a communication resource of the information amount is reduced. Additionally, a problem exists in that the processing load on the base station for determining the MAP information increases.

The present invention has been made to solve the above-described problem and provides an OFDMA communication system and communication method that can suppress the communication resource reduction and reduce the processing load on a base station.

Means for Solving the Problem

To solve the above-described problem, a communication system according to the present invention is an OFDMA communication system for performing communication using one or more subchannels between a base station and a plurality of terminals, the communication system comprising: a downlink frame generation unit which generates a downlink frame for a downlink period for performing communication from the base station to at least one terminal of the plurality of terminals; an uplink frame generation unit which generates an uplink frame for an uplink period for performing communication from at least one terminal of the plurality of terminals to the base station; and a channel allocation unit which allocates, for one terminal of the plurality of terminals, one or more subchannels available in the one terminal, wherein the channel allocation unit notifies information of the allocated one or more available subchannels to the one terminal only by the downlink frame.

Further, the information of the one or more available subchannels is indicated as a bit string corresponding to numbers assigned to the subchannels. Further, an OFDMA communication method for performing communication using one or more subchannels between a base station and a plurality of terminals, comprises: generating a downlink frame for a downlink period for performing communication from the base station to at least one terminal of the plurality of terminals, and an uplink frame for an uplink period for performing communication from at least one terminal of the plurality of terminals to the base station; and allocating, for one terminal of the plurality of terminals, one or more subchannels available in the one terminal, wherein information of the allocated one or more available subchannels is notified to the one terminal only by the downlink frame.

Further, the information of the one or more available subchannels is indicated as a bit string corresponding to numbers assigned to the subchannels.

Advantage of the Invention

In an OFDMA communication system and communication method according to the present invention, the communication resource reduction can be suppressed. The processing load on a base station can be reduced.

DESCRIPTION OF REFERENCE NUMERALS AND SIGNS

10: BASE STATION
11,21: QoS CONTROL UNIT
12,22: SCHEDULER
13,23: BAND ALLOCATION UNIT
14: DOWNLINK FRAME GENERATION UNIT
15,25: MODULATION UNIT
16, 26: TRANSMISSION UNIT
17, 27: COMMUNICATION MANAGEMENT UNIT
20: TERMINAL
24: UPLINK FRAME GENERATION UNIT
S1 to S4: TIME SLOT
$C_1$ to $C_4$: CONTROL SUBCHANNEL
$T_1$ to $T_{108}$: TRAFFIC SUBCHANNEL

BEST MODE FOR CARRYING OUT THE INVENTION

Hereinafter, on embodiment of a communication system according to the present invention will be described in detail with reference to the drawings.

Figure 1:
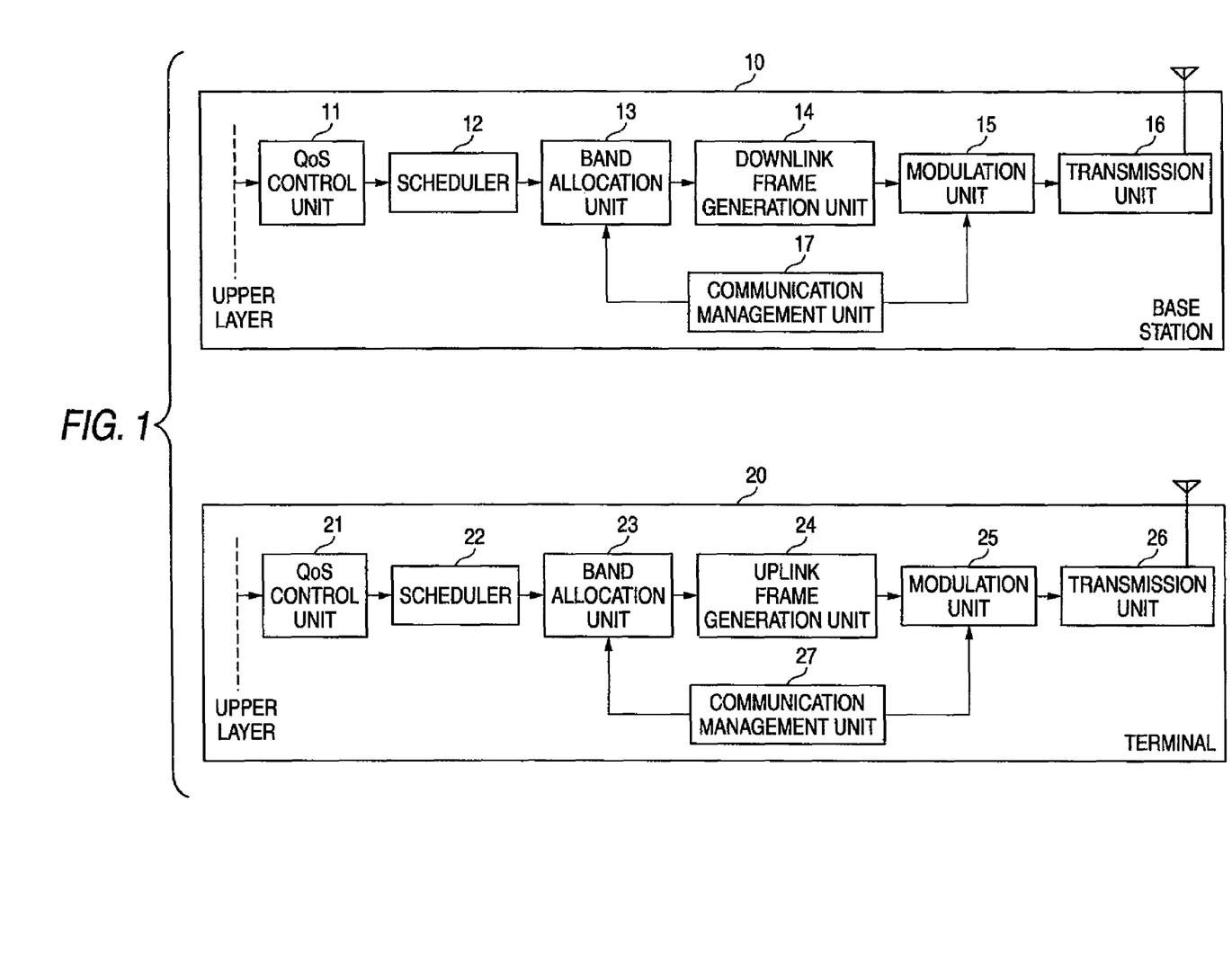
FIG. 1 is a block diagram showing transmission functions of a base station and a terminal in a communication system according to an embodiment of the present invention.

This communication system is an OFDMA communication system for performing communication by a frame including a plurality of subchannels for each frequency band between a base station (CS: cell station) and a plurality of terminals (PS: personal station). FIG. 1 is a block diagram showing transmission functions of a base station and a terminal in a communication system according to an embodiment of the present invention.

As shown in FIG. 1, a base station includes, as transmission functions, a QoS control unit 11 for dividing a QoS class for data transmitted from an upper layer according to a communication priority, a scheduler 12 for scheduling communication according to the priority by which the class is divided, a band allocation unit 13 for allocating a subchannel described later to each slot, a downlink frame generation unit 14 for generating a downlink frame for a downlink period for performing communication to a terminal 20, a modulation unit 15 for modulating a downlink frame signal, a transmission unit 16 for transmitting a radio signal to the terminal, and a communication management unit 17 for managing communication by controlling the band allocation unit 13 and the modulation unit 15. The downlink frame generation unit 14 generates the downlink frame by four continuous physical frames transmitted from the upper layer through the QoS control unit 11 and the scheduler 12 and allocated to each subchannel through the band allocation unit 13.

A terminal 20 includes, as transmission functions, includes a QoS control unit 21 for dividing a QoS class for data transmitted from an upper layer according to a communication priority, a scheduler 22 for scheduling communication according to the priority by which the class is divided, a band allocation unit 23 for allocating a subchannel described later to each slot, an uplink frame generation unit 24 for generating an uplink frame for an uplink period for performing communication to the base station 10, a modulation unit 25 for modulating an uplink frame signal, a transmission unit 26 for transmitting a radio signal to the base station, and a communication management unit 27 for managing communication by controlling the band allocation unit 23 and the modulation unit 25. The uplink frame generation unit 24 generates the uplink frame by four continuous physical frames transmitted from the upper layer through the QoS control unit 21 and the scheduler 22 and allocated to each subchannel through the band allocation unit 23.

Figure 2:
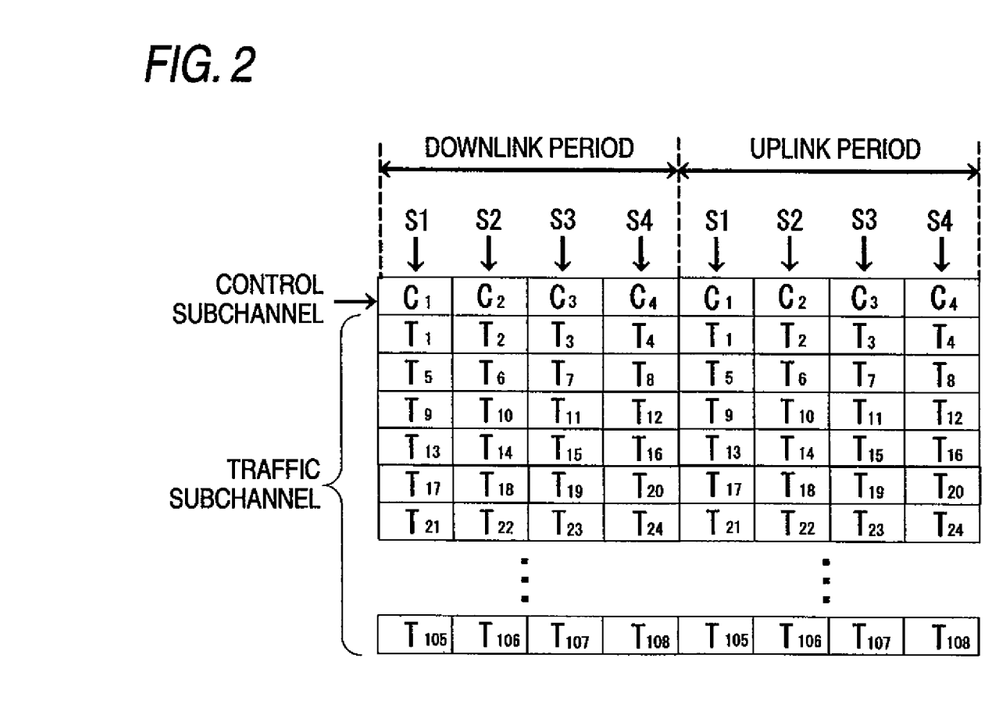
FIG. 2 is an illustrative diagram showing an OFDMA frame configuration to be used in a communication method according to an embodiment of the present invention.

FIG. 2 is an illustrative diagram showing an OFDMA frame configuration to be used in a communication method according to an embodiment of the present invention.

The frame is arranged so that a time slot of the downlink period for performing communication from the base station to the terminal and a time slot of the uplink period for performing communication from the terminal to the base station are adjacent to each other.

In a frame configuration indicating the allocation of a plurality of subchannels in the above-described frame, the downlink frame as a frame of the period of the downlink (link from the base station to the terminal) and the uplink frame as a frame of the period of the uplink (link from the terminal to the base station) are continuous and have symmetric configurations. Here, the term "symmetric" indicates that the downlink and the uplink have the same period and the same number of slots.

For example, the frame configuration of FIG. 2 is a configuration of the case of four time slots (S1 to S4) as in a conventional PHS system used widely. The vertical axis denotes the frequency axis and the horizontal axis denotes the time axis. According to this configuration, it can be incorporated and used in the conventional PHS system.

In FIG. 2, both in the downlink period and the uplink period, it is divided into 28 frequency bands with respect to the frequency axis. A subchannel capable of being allocated to the first frequency band is called a control subchannel and used in a control channel (CCH).

The above-described first frequency band can be the highest frequency band or the lowest frequency band.

The example of FIG. 2 is an example of the PHS system. Four base stations can be allocated to control subchannels $C_1$ to $C_4$.

Each of the remaining 27 frequency bands (groups) is divided into four parts for each time slot in the time-axis direction and all 108 subchannels are provided. These are traffic subchannels $T_1$ to $T_{108}$ for transmitting and receiving data. That is, in the OFDMA scheme in the communication of this embodiment, the number of subchannels (the number of extra subchannels) is as many as 108 since the subchannels of the conventional OFDMA scheme are divided in the time-axis direction.

The traffic subchannels include subchannels called an anchor subchannel and on extra subchannel.

The anchor subchannel is a subchannel used to provide each terminal with a notification indicating which user uses which subchannel or used for the base station and terminal to negotiate whether data has been accurately exchanged in re-transmission control, and one anchor subchannel can be allocated to each terminal at a start of communication.

The extra subchannel is a subchannel for transmitting data to be used substantially, and an arbitrary number of extra subchannels can be allocated to one terminal. In this case, as the number of allocated extra subchannels increases, high-speed communication is possible since a band extends.

Figure 3:
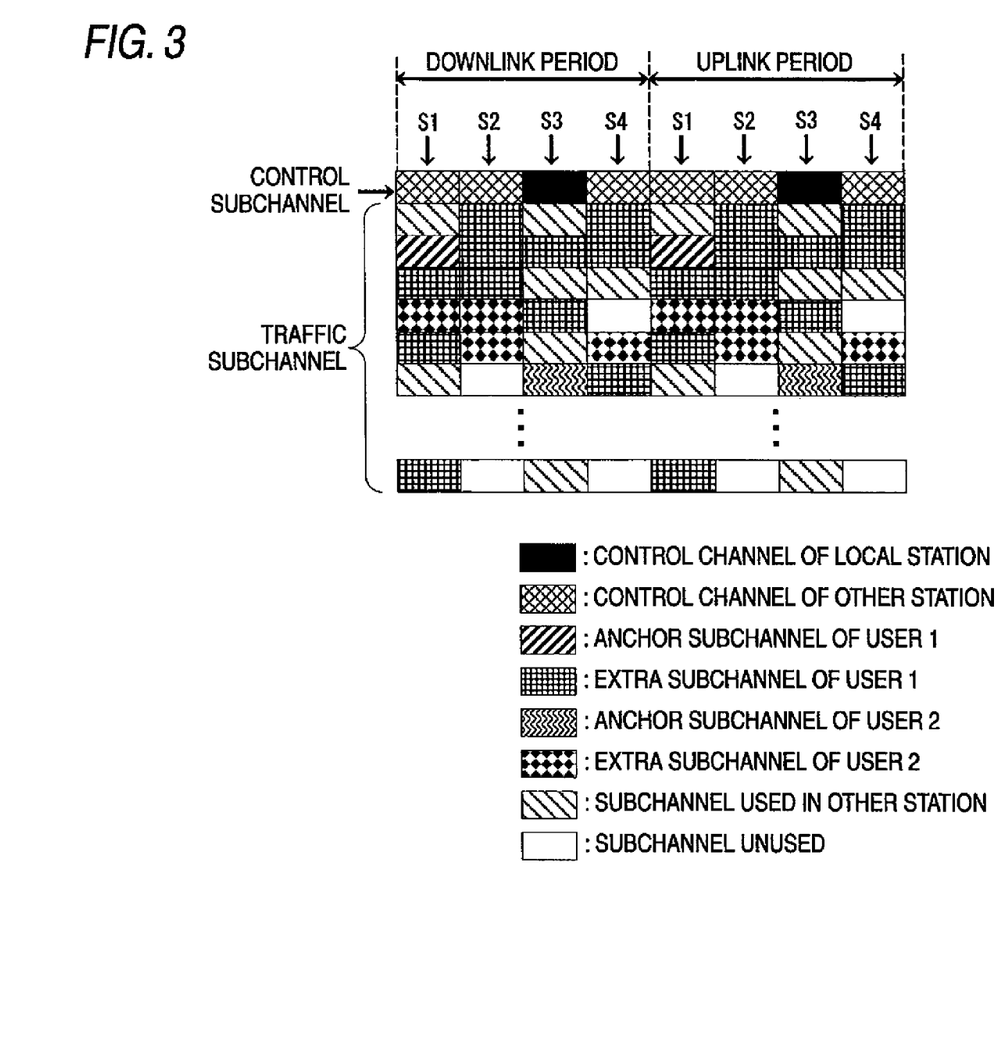
FIG. 3 is an illustrative diagram showing one example of a MAP configuration in the frame of FIG. 2.

Next, the above-described traffic subchannel allocation will be described. FIG. 3 is an illustrative diagram of one example of subchannel allocation. In the example shown in FIG. 3, each traffic subchannel allocation is shown in various patterns.

In the example shown in FIG. 3, a control channel of a base station of $C_3$ among four base stations is shown in control subchannels. Symbols of $C_3$, $T_2$, and the like correspond to FIG. 2.

$T_5$ is allocated as an anchor subchannel for a terminal of a user 1. $T_2$, $T_4$, $T_6$, $T_7$, $T_8$, $T_9$, $T_{10}$, $T_{15}$, $T_{17}$, $T_{24}$, ..., $T_{105}$ are allocated as extra subchannels for the terminal of the user 1. These subchannels are common to the downlink and the uplink.

$T_{23}$ is allocated as an anchor subchannel for a terminal of a user 2. $T_{13}$, $T_{14}$, $T_{18}$, $T_{20}$, ... are allocated as extra subchannels for the terminal of the user 2. For the user 2 like the user 1, the subchannel allocation is common to the downlink and the uplink.

$T_1$, $T_2$, $T_{11}$, $T_{12}$, $T_{19}$, $T_{21}$, ..., $T_{107}$ are used between other base stations and other terminals, and $T_{16}$, $T_{22}$, ..., $T_{106}$, $T_{108}$ are unused subchannels.

As described above, in a frame configuration in the communication system of this embodiment shown in FIG. 3, the downlink frame as a frame of the downlink period and the uplink frame as a frame of the uplink period are continuous and have symmetric configurations.

Next, the format of a subchannel will be described using FIG. 4.

Figure 4:
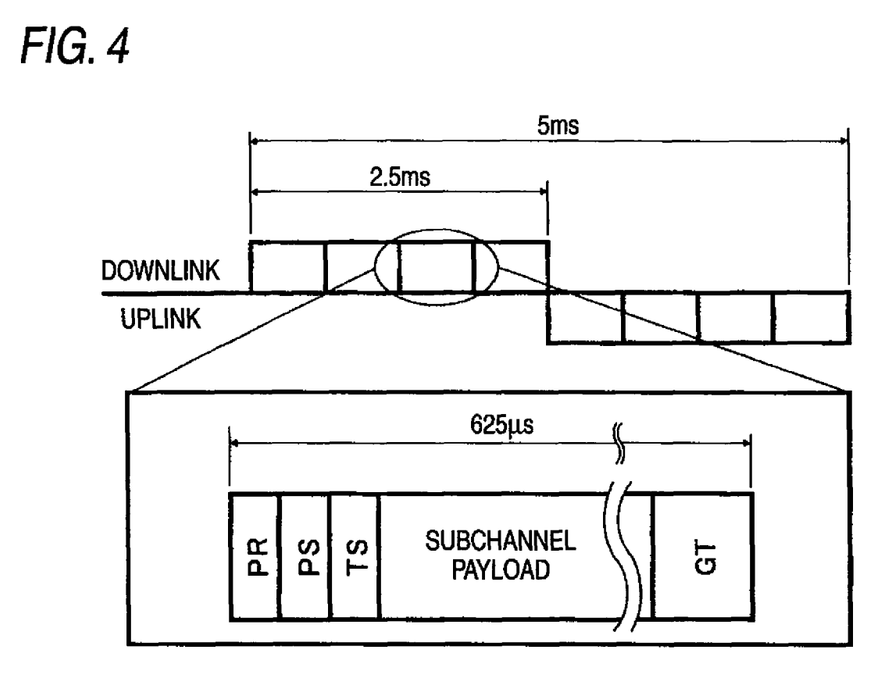
FIG. 4 is an illustrative diagram showing the format of a subchannel.

As shown in FIG. 4, one frequency band includes four downlink subchannels and four uplink subchannels and a total length on the time axis is, for example, 5 ms.

Each subchannel includes PR (PRiamble), PS (Pilot Symbol), and other fields and a length on the time axis is, for example, 625 μs.

PR is a preamble and a signal for providing synchronizing timing by identifying the start of frame transmission.

PS is a pilot symbol and a known signal waveform for obtaining a phase standard to accurately identify an absolute phase, or known data.

A subchannel payload is a part for accommodating data of a physical layer (PHY).

Figure 5:
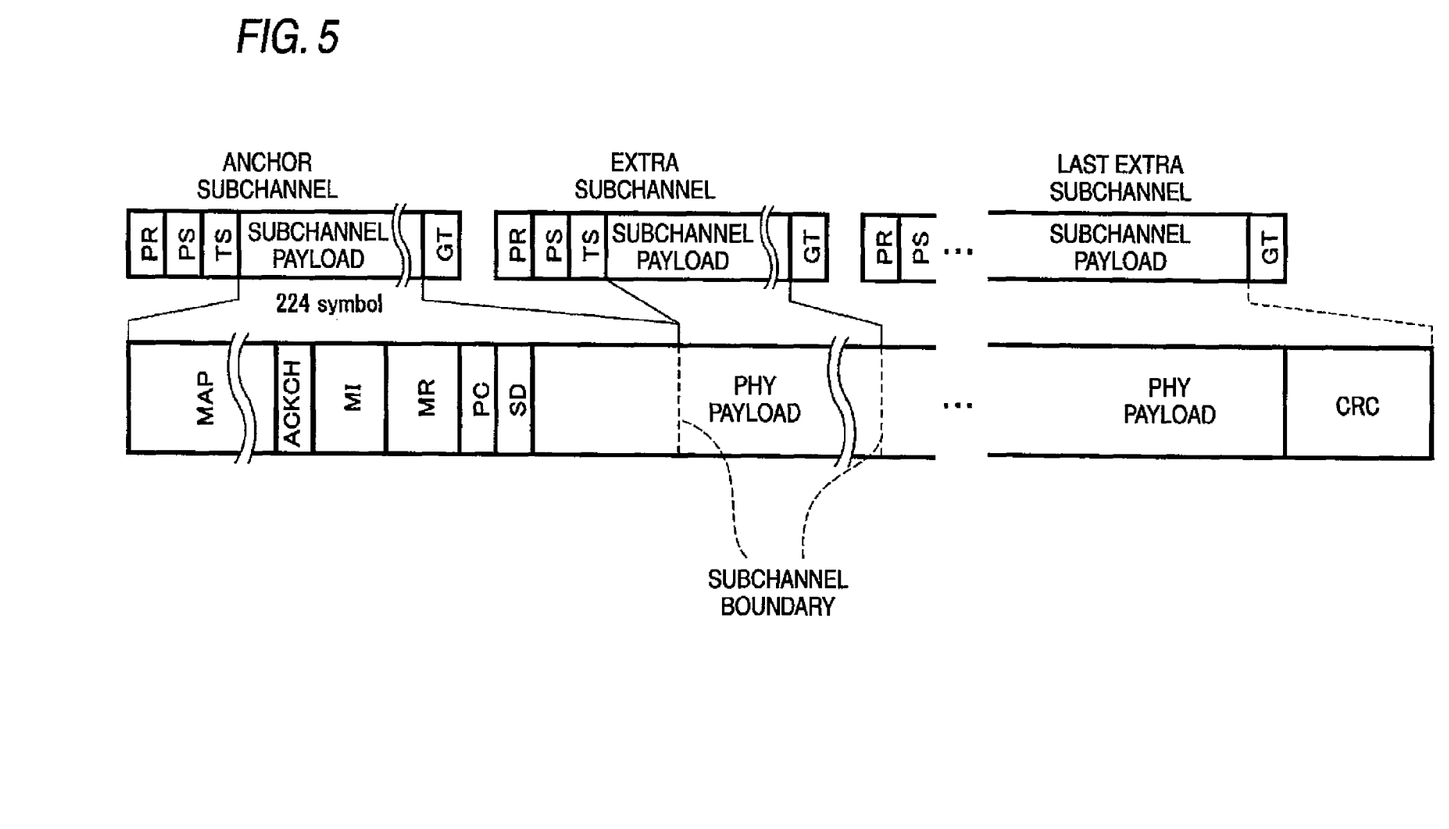
FIG. 5 is an illustrative diagram showing the format of a downlink physical layer (PHY).

Next, the format of a downlink physical layer (PHY) will be described using FIG. 5.

A subchannel payload of an anchor subchannel includes fields of MAP, ACKCH, PHY payload, and the like. The PHY payload accommodated in a subchannel payload of respective extra subchannel is connected thereto. A CRC field is arranged in the end part of the last extra subchannel.

A bit array accommodated in the above-described MAP field is MAP information to be transmitted to a terminal (information indicating an available or unavailable subchannel for the terminal), and a number is assigned to a traffic subchannel included in one frame and indicated by a bit string corresponding thereto.

For example, when a bit corresponding to on $n^{th}$ traffic subchannel is "1", it notifies that the $n^{th}$ traffic subchannel can be allocated and used for a corresponding terminal. When the bit corresponding to the $n^{th}$ traffic subchannel is "0", it notifies that the $n^{th}$ traffic subchannel cannot be used for the corresponding terminal.

For example, the MAP information in the example of the frame configuration of FIG. 3 is as follows.

A bit array of the MAP information to be transmitted to the terminal of the user 1 becomes "01010111110000101 ... 1000".

A bit array of the MAP information to be transmitted to the terminal of the user 2 becomes "00000000000011000101 ... ".

With this configuration, it is not necessary to transmit MAP information for each of a terminals as MAP information for a downlink frame and MAP information for an uplink frame separately, and therefore, it is possible to suppress the communication resource reduction. Furthermore, since information on an available subchannel is transmitted by a bit string at a position corresponding to a number of the subchannel, it is not necessary to transmit superfluous information, thereby allowing notification with a minimal amount of data.

Figure 6:
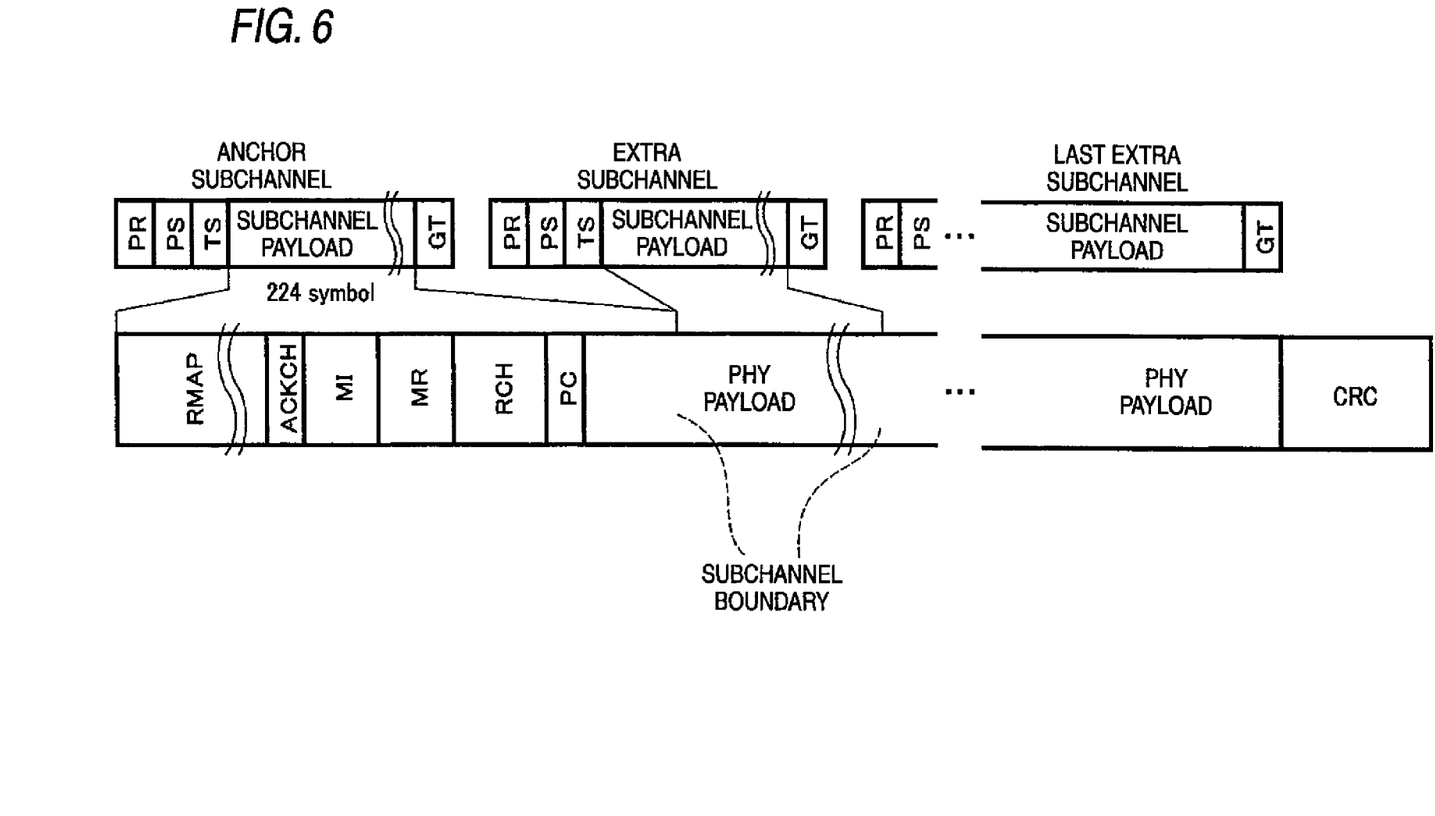
FIG. 6 is an illustrative diagram showing the format of an uplink physical layer (PHY).

Next, the format of an uplink physical layer (PHY) will be described using FIG. 6.

A subchannel payload of an anchor subchannel includes fields of RMAP, ACKCH, PC, PHY payload, and the like. The PHY payload accommodated in a subchannel payload of respective extra subchannel is connected thereto. A CRC field is arranged in the end part of the last extra subchannel.

The RMAP is used to send a reply by determining whether or not a subchannel indicated from the base station is available. For example, when another terminal or another base station, and the like exists around a terminal, a disturbance level by an interference wave therefrom is large, and normal communication by a subchannel corresponding thereto cannot be performed, a reply indicating that the subchannel is unavailable is sent to the base station. That is, an RMAP bit corresponding to an unavailable subchannel is set to "0".

For example, in the case of determining that a terminal side cannot use a third subchannel when MAP information (MAP bit array) transmitted from the base station to a certain terminal in the downlink is "10110 ... ", a third bit is set to "0". Accordingly, in this case, a reply of the RMAP of an array of "10010 ... " is sent to the base station side in the uplink.

Figure 7:
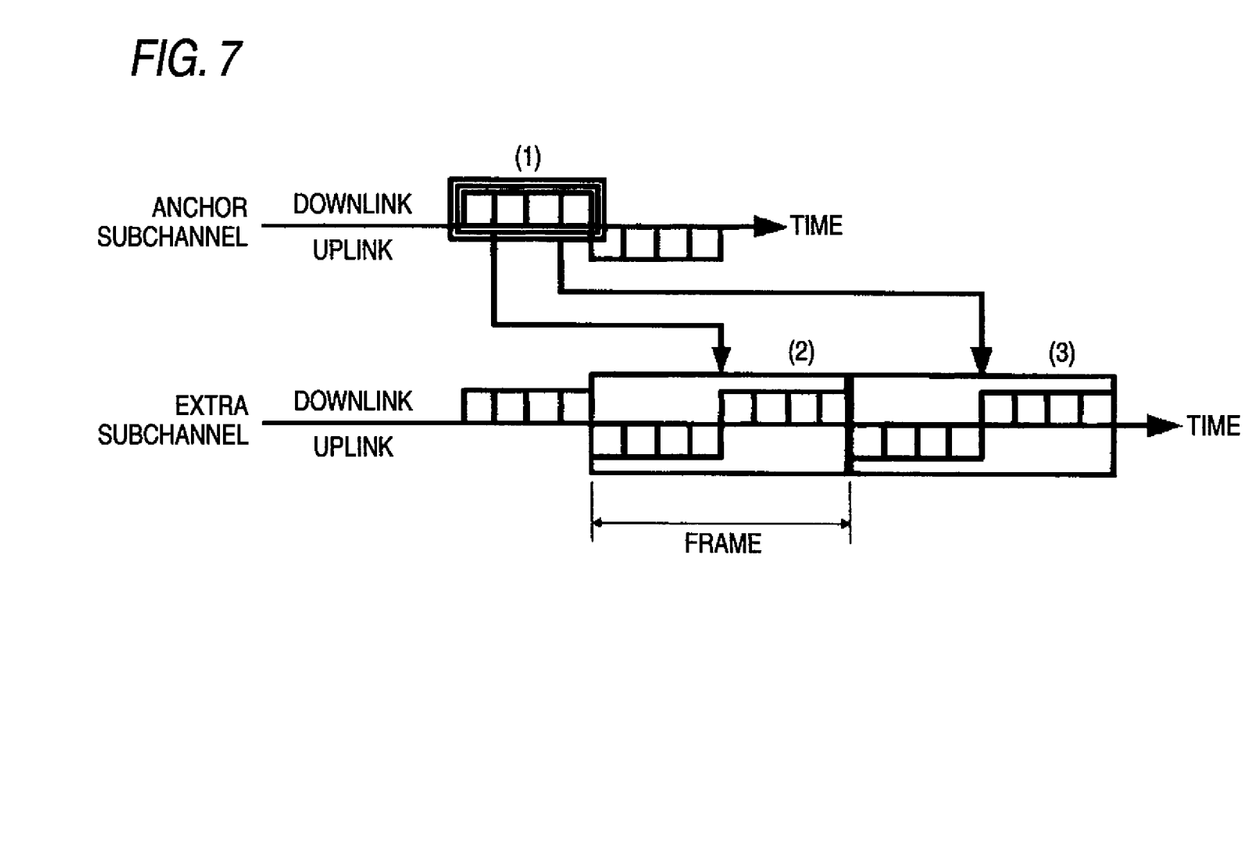
FIG. 7 is an illustrative diagram showing a frame corresponding to transmitted MAP information.

Next, a frame corresponding to transmitted MAP information will be described using FIG. 7.

The base station notifies communication right to the terminal in a MAP field included in an anchor subchannel in the downlink period of (1) (as indicated by the timing of (1)).

Next, an extra subchannel to be used is indicated in the notified MAP information and communication is performed in (the timing of) a frame of either (2) or (3) using the extra subchannel whose use is indicated.

Next, whether to perform communication in the frame of either (2) or (3) is determined in an initial step of a connection of the base station and the terminal. It is determined that a communicable frame is (2) or (3) according to a condition of a terminal in which a demodulation process rate is slow, and the like. Once the determination is made, whether to perform communication in the frame of either (2) or (3) is not changed until the communication is terminated.

Since the number of subchannels (the number of extra subchannels) is as many as 108 in the OFDMA scheme in the communication system of this embodiment, the number of subchannels capable of being allocated to each user is also large. Accordingly, when the MAP information also increases essentially and the MAP information exchange is also performed between the base station and the terminal in the uplink in addition to the downlink, a large amount of communication resources is used and a payload for communicating the original data is reduced.

However, when the subchannel allocation of the uplink is common to the downlink since a downlink frame as a frame of a downlink period and an uplink frame as a frame of an uplink period are continuous and have symmetric configurations in the communication system of this embodiment as shown in FIG. 3. MAP information is notified from the base station to the terminal, for example, only by the downlink, so that a notification of the MAP information in the uplink is unnecessary and throughput can be improved since a payload part for communicating the original data can be secured plentifully.

As described above, a communication system according to the embodiment of the present invention includes a downlink frame generation unit 14 that generates a downlink frame for a downlink period for performing communication from a base station 10 to at least one terminal 20 of a plurality of terminals, and an uplink frame generation unit 24 that generates an uplink frame for an uplink period for performing communication from at least one terminal 20 of the plurality of terminals to the base station 10, wherein the downlink frame and the uplink frame have symmetric configurations.

Thereby, the communication resource reduction can be suppressed and the processing load on the base station 10 can be reduced. The compatibility with the conventional PHS system can be maintained.

Priority is claimed on Japanese Patent Application No. 2006-257969, filed Sep. 22, 2006, and Japanese Patent Application No. 2006-320777, filed Nov. 28, 2006, the content of which is incorporated herein by reference.

The invention claimed is:

1. An OFDMA communication system for performing communication using one or more subchannels between a base station and a plurality of terminals, the communication system comprising:
    a downlink frame generation circuit which generates a downlink frame for a downlink period for performing communication from the base station to at least one terminal of the plurality of terminals;
    an uplink frame generation circuit which generates an uplink frame for an uplink period for performing communication from at least one terminal of the plurality of terminals to the base station; and
    a channel allocation circuit nit which allocates, for one terminal of the plurality of terminals, one or more subchannels available in the one terminal, wherein
    the channel allocation circuit notifies information of the allocated one or more available subchannels for a sequence pair of downlink and uplink frames to the one terminal only by the downlink frame,
    the channel allocation circuit notifies the information of the allocated one or more available subchannels to each terminal on a different anchor subchannel for the each terminal, and
    the each terminal is notified of its individual allocation on a different anchor subchannel for the each terminal.

2. The communication system of claim 1, wherein the information of the one or more available subchannels is indicated as a bit string corresponding to numbers assigned to the subchannels.

3. An OFDMA communication method for performing communication using one or more subchannels between a base station and a plurality of terminals, the communication method comprising:
    generating a downlink frame for a downlink period for performing communication from the base station to at least one terminal of the plurality of terminals, and an uplink frame for an uplink period for performing communication from at least one terminal of the plurality of terminals to the base station; and
    allocating, for one terminal of the plurality of terminals, one or more subchannels available in the one terminal, wherein
    information of the allocated one or more available subchannels for a sequence pair of downlink and uplink frames is notified to the one terminal only by the downlink frame,
    the information of the allocated one or more available subchannels is notified to each terminal on a different anchor subchannel for the each terminal, and
    the each terminal is notified of its individual allocation on a different anchor subchannel for the each terminal.

4. The communication method of claim 3, wherein the information of the one or more available subchannels is indicated as a bit string corresponding to numbers assigned to the subchannels.

* * * * *